Nov. 9, 1948.  A. BERTEA  2,453,359
ELECTRIC MOTOR
Filed July 23, 1946  3 Sheets-Sheet 1

INVENTOR.
Alex Bertea
BY
ATTORNEY.

Nov. 9, 1948.  A. BERTEA  2,453,359
ELECTRIC MOTOR
Filed July 23, 1946  3 Sheets-Sheet 2
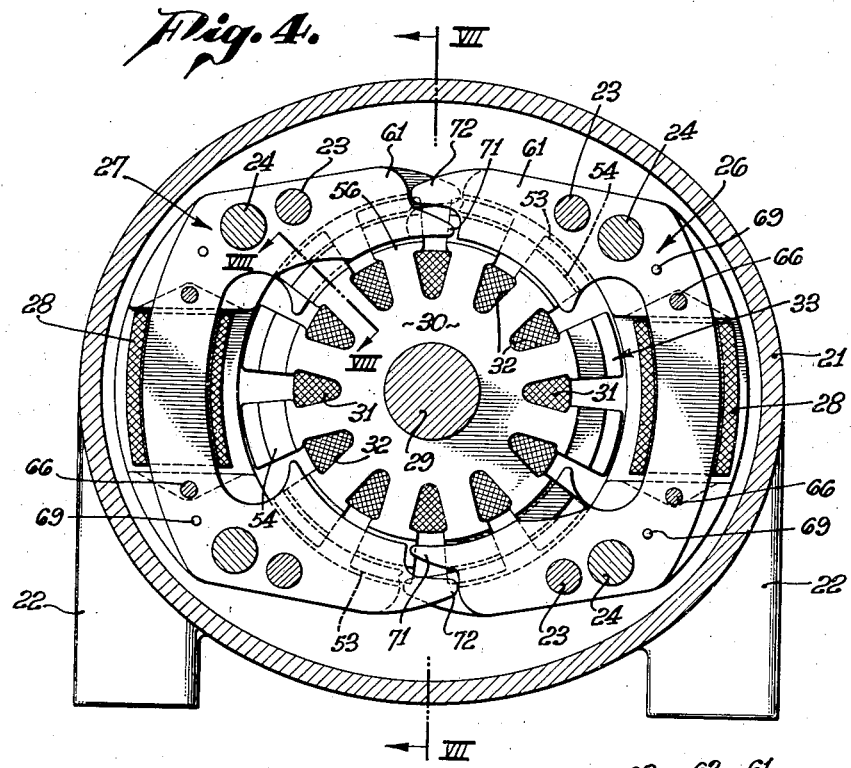
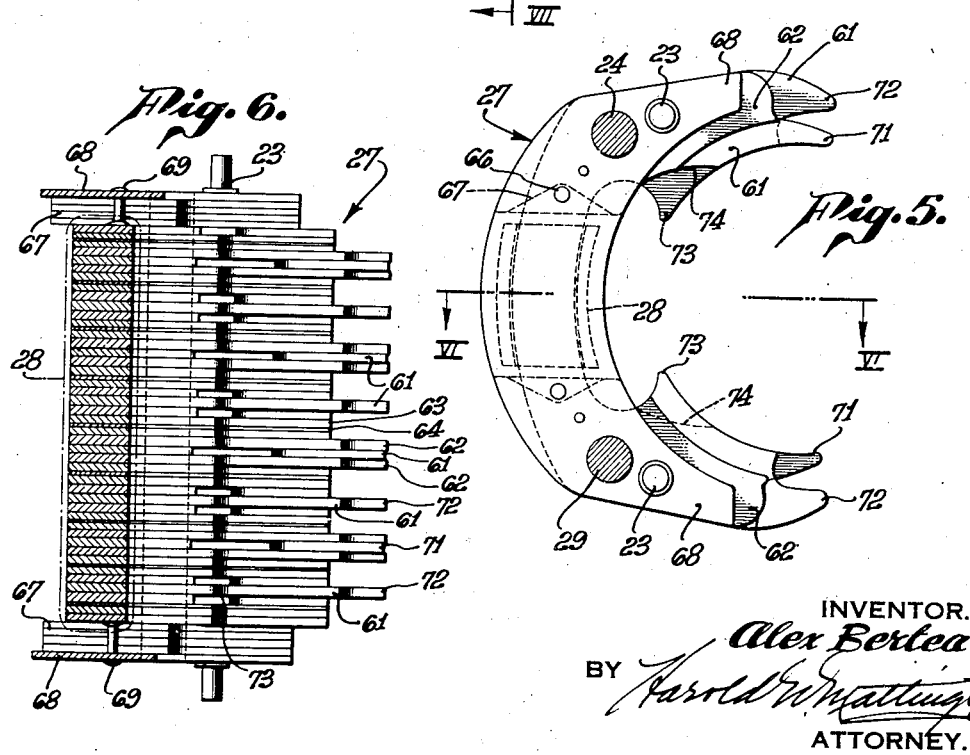
INVENTOR.
Alex Bertea
BY
ATTORNEY.

Nov. 9, 1948.    A. BERTEA    2,453,359
ELECTRIC MOTOR
Filed July 23, 1946    3 Sheets-Sheet 3
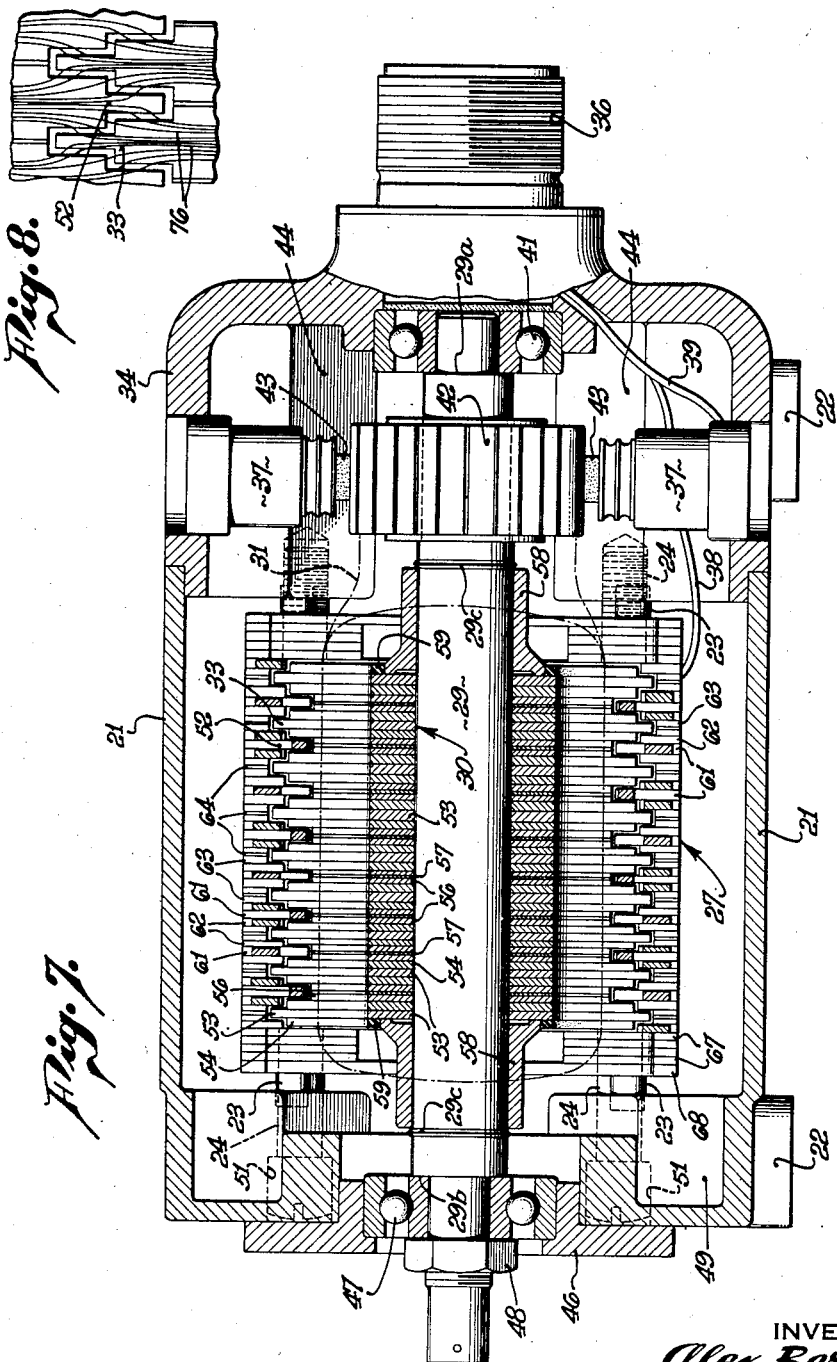
INVENTOR.
Alex Bertea
BY
ATTORNEY.

Patented Nov. 9, 1948

2,453,359

UNITED STATES PATENT OFFICE 2,453,359

ELECTRIC MOTOR

Alex Bertea, Altadena, Calif.

Application July 23, 1946, Serial No. 685,588

1 Claim. (Cl. 172—36)

My invention relates to electric motors, and more particularly to a motor primarily designed to operate upon magnetic attraction and repulsion between the armature and field, instead of the usual effect of current in a conductor opposing a magnetic field.

I have discovered that the efficiency and power of an electric motor may be greatly improved if the field poles and armature thereof are designed for the maximum magnetic interaction rather than for the maximum field strength for current opposition. Also I have discovered that by increasing the area of contact between the core of the armature and the field magnet, the magnetic attraction and repulsion between the armature and the field may be greatly enhanced. Accordingly I have employed these discoveries in the design and construction of a motor to be described hereinafter which is an improvement on my co-pending application, Ser. No. 581,420, filed March 7, 1945.

It is therefore an object of my invention to provide an electric motor of improved efficiency, torque, and performance.

Another object of the invention is to provide an improved electric motor operating upon the principle of magnetic attraction and repulsion between the armature and field pieces.

Still another object of the invention is to provide an electric motor having an improved flux circuit juncture between the armature and field pieces to reduce air gap reluctance.

Another object of my invention is to provide motor field members having a configuration that gives a motor performance equivalent to spiral or skewed windings on a motor armature.

A further object of the invention is to provide a motor field pole construction having maximum flux density or magnetic strength adjacent the boundaries thereof instead of the usual maximum near the center.

Other objects and advantages of the invention will be apparent in the following description and claims, considered together with the accompanying drawings, in which Fig. 1 is a diagram illustrating the magnetic field of a motor armature employed in the invention;

Fig. 4 is a transverse sectional view through an electric motor made in accordance with the invention;

Fig. 5 is an end view of one of the two field magnets of the motor of Fig. 4;

Fig. 6 is a sectional view of one of the field magnets taken along the line VI—VI of Fig. 5;

Fig. 7 is an elevation view in full section of the motor of Fig. 4 taken along the line VII—VII of that figure; and Fig. 8 is an enlarged fragmentary view of the structure of the armature and field magnets taken along the line VIII—VIII of Fig. 4 at the mating surfaces thereof and indicating further the lines of magnetic flux traversing the air gap between them.

Figure 1:
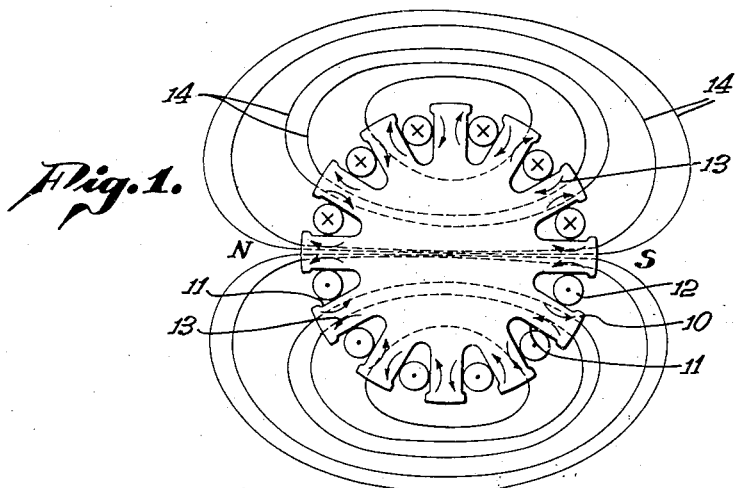

The armature of Fig. 1 may employ laminations 10 of the usual star-shape construction to form an armature core of high magnetic permeability. These laminations may be of any desired material, such as the silicon steel commonly used in the electrical industry. The laminations are provided with the usual conductor slots such as slots 11 in which may be placed conductors 12 which are shown schematically inasmuch as they occupy only a portion of the slots 11. Current may be supplied to these conductors 11 in any desired fashion such as by a commutator, and the direction of current flow at any given instant is indicated by the crossses and dots applied to the cross section of the conductors 12, the crosses indicating current flowing away from the observer, and the dots indicating current flowing toward the observer. In accordance with the usual magnetic principles, the current flowing in these conductors 12 sets up magnetic fields which are indicated by arrows 13 adjacent each conductor. It is apparent that the current in one conductor cancels the immediate magnetic field of the adjacent conductor except along the brush line where the magnetic fields add to each other and thus establish the direction of polarity for the entire armature. Accordingly, therefore, the additive effects of the magnetic field produced by current fields in all of the conductors 12 results in the establishment of an electromagnet having poles disposed along a horizontal line with respect to Fig. 1, and wherein the polarity is designated by letters N and S, indicating north and south poles, respectively.

It is obvious from an inspection of Fig. 1 that the flux of the armature electromagnet is concentrated primarily in the projecting poles of the laminations 10. I have measured the flux intensity of a typical 12-pole armature as indicated in Fig. 1 and find that of the total number of flux lines emanating from one-half of the electromagnet, approximately 32% will emanate from the main north or south pole, while the poles adjacent thereto will each furnish approximately 23% of the total flux, and the next adjacent poles will each furnish about 11%. The two poles at right angles to the main polarity of the magnet furnish little or no measurable flux to the total field. Accordingly this flux intensity for the armature electromagnet is shown approximately in terms of flux lines 14 in Fig. 1.

Figure 2:
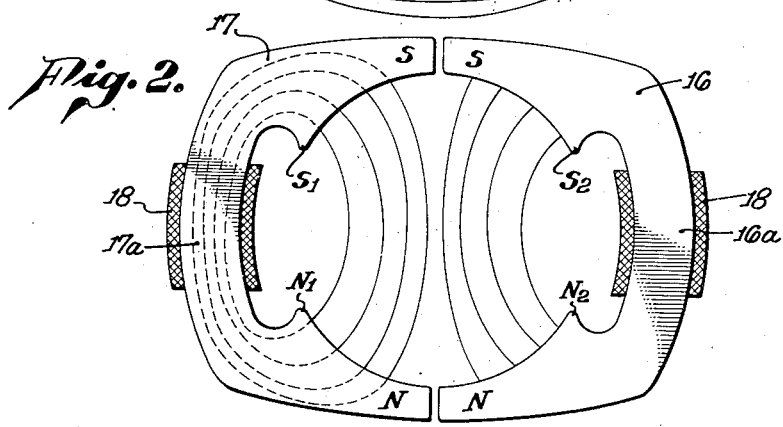
Fig. 2 is a diagram illustrating field magnets made in accordance with the invention and indicating the lines of magnetic flux of the field.

The field structure of Fig 2 includes two separable magnet members 16 and 17 that are preferably identical or complementary in the sense that one is a mirror image of the other. The field pieces 16 and 17 are preferably formed from C-shaped laminations of steel such as the silicon steel normally employed for field purposes. Each pole member 16 and 17 may be supplied with a winding 18 which is disposed particularly in accordance with the invention at the central part 16a and 17a of the general C-shaped field members 16 and 17, respectively. The current passed through the windings 18 is in such direction that the adjoining portions of the field magnets 16 and 17 are of similar polarity indicated by the letters SS and NN, indicating south and north, respectively. The placement of the windings 18 at the central part of the C-shaped members 16 and 17 results in a concentration of flux lines at the region nearest to the windings 18. Therefore the edges of each magnetic pole are strongest as at S—1, S—2 and N—1, N—2, while the outermost joining portions of the two pole pieces 16 and 17 are the weakest portions. The strength of the magnets 16 and 17 is indicated by flux lines 19 showing approximately the relative strength at different portions. The concentration of strength adjacent the edges of the pole portion and the weakening of the field strength at the center of the pole portions is in contrast to the usual field design for motors.

Figure 3:
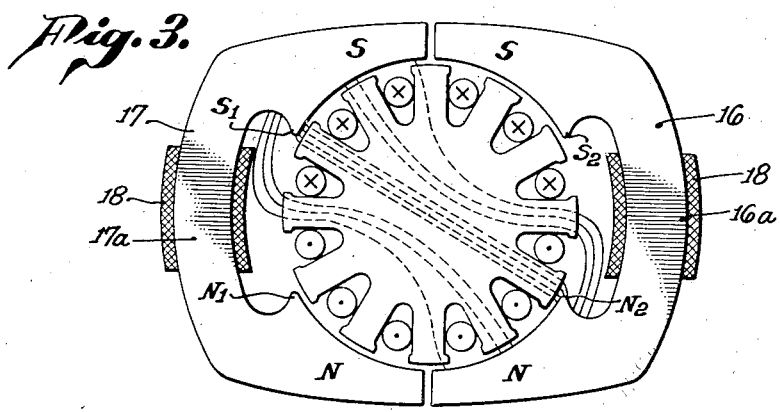
Fig. 3 is a diagram showing the armature of Fig. 1 disposed in the field of Fig. 2 and showing the resulting flux lines in the armature core and the motor air gap.

The armature of Fig. 1 is placed within the field of Fig. 2 to form the motor of Fig. 3. The north and south poles of the armature are indicated by the letters N and S and it will be noted that the north armature pole is repelled by the north field pole of magnet 17 and attracted by the south field pole of magnet 17. Likewise, the south armature pole is repelled by the south field pole of magnet 16 and attracted by the north field pole of magnet 16. This attraction and repulsion causes the armature to rotate within the field member, assuming that the usual commutator is present to maintain the flow of current in the armature windings 12 at a fixed relation regardless of the rotation of the armature. This fixed relation as explained is substantially about a horizontal line with respect to Figs. 1 and 3. The concentration of the field flux at the pole edge S—1 results in an increased flux density in the armature pole immediately adjacent that pole edge, and the same change in flux pattern occurs at the armature south pole. Accordingly, the entire armature electromagnet is slightly rotated with respect to the horizontal axis about which the commutation of current to the armature takes place.

As indicated in Fig. 3, the attraction of the north armature pole toward the south field pole and vice-versa on the opposite end of the armature causes the rotative effect of the motor rather than cutting lines of field flux as is usually desired in the conventional motor. Accordingly the motor embodying my invention will seek to utilize to the greatest extent the attraction and repulsion of magnetic poles rather than attempt to provide a uniform flux between armature and field magnets for the conductors 12 to cut or oppose. This magnetic attraction and repulsion is enhanced by the concentration of magnetic field strength at the pole edges S—1, S—2, and N—1, N—2, since they are most immediately adjacent to the strongest portion of the armature electromagnetic field.

Referring to Fig. 4, there is illustrated an electric motor embodying my invention which may include a housing 21 supported on legs 22 and through which bolts may be passed to secure the motor as a whole to a desired mounting member. The frame 21 may be of non-magnetic material inasmuch as no motor yoke is required to complete the magnetic circuit of the field structure of my invention. Accordingly this frame 21 may be of aluminum such as is desirable when the motor is used for purposes in aircraft or other locations requiring a minimum weight. Supported on dowel pins 23 and through-bolts 24 are two field magnets 26 and 27, each of a general C-shape and having a winding 28 disposed about the central part of the C-shape. Disposed within the field magnets 26 and 27 is an armature 30 rotatable upon a shaft 29 and having windings 31 disposed within slots 32 formed within the armature 30. Projecting from each pole piece of the armature 30 are leaves 33 of graduated thickness as will be described in greater detail hereinafter.

Referring to Fig. 7, it will be noted that the motor housing 21 may receive an end bell 34 terminating in an electrical fitting 36 through which electrical connection may be made to field wires 38, and wires 39 leading to brush assemblies 37. The end bell 34 may be axially drilled to receive a ball-bearing assembly 41 in which the shaft 29 is journalled and secured against end movement by an integral shoulder 29a on the shaft contacting the inner race of the ball-bearing assembly 41. Secured on one end of shaft 29 is a commutator assembly 42 which is contacted by brushes 43 retained within the brush assembly 37. The windings 31 indicated by a broken outline in Fig. 7 may be connected to the commutator 42 in any desired manner; for example, the conventional manner for universal motors. The end bell 34 also may have two integral bosses 44 formed therein which are appropriately drilled to receive the dowels 23 and which are appropriately drilled and tapped to receive the through-bolts 24.

The end of the housing 21 opposite from that of the end bell 34 (Fig. 7) may be axially drilled to receive a bushing 46 which may retain a ball-bearing assembly 47 for the other end of the shaft 29. The bushing 46 is preferably secured to the housing 21 as by bolts (not shown). The shaft 29 is held against axial movement within the ball-bearing 47 by a shoulder 29b formed on the shaft and by a nut 48 threaded on the outer end of the shaft to retain the inner race of the ball-bearing assembly 47 against the shoulder 29. The bushing 46 restrains the ball-bearing assembly 47 from moving outwardly, and the ball-bearing assembly 41 on the other end of the shaft is secured against movement to prevent the shaft 29 from moving toward the right with respect to Fig. 7. The housing 21 has internal bosses 49 which may be drilled to receive the dowels 23 and which may be drilled and counterbored at 51 to receive the through-bolts 24.

By referring to all of the Figs. 4 through 8, it will be noted that the armature leaves 33 of a graduated thickness are spaced along the length of the entire armature 30 and fit between projecting leaves 52 formed in the field magnets 26 and 27. The armature 30 is accordingly made from laminations of three different sizes; namely, projecting teeth laminations 53, step laminations 54, and root laminations 56. A paper member 57 of similar shape to the root laminations 56 is positioned between the pairs of root laminations 56 forming the bottom of each recess between adjacent armature leaves 33. Accordingly it will be noted that each graduate leaf comprises a central tooth lamination 53 bounded on either side by step laminations 54 of lesser outside diameter, and positioned on the outer sides of the two step laminations are root laminations 56. The teeth laminations 53 and the step laminations 54 may be substantially the same width or thickness, but the root laminations 56 may be of lesser thickness so that when spaced from each other by the paper spacers 57 they will define a recess of sufficient width to receive a projecting tooth from the field magnets. The armature laminations 53, 54, and 56, together with the paper spacers 57, may be assembled upon the shaft 29 and may be held thereon by end sleeves 58 which may be pressed on the shaft. When the proper amount of compression is obtained for the armature laminations, the sleeves 58 may be secured immovably on the shaft 29 such as by upsetting the shaft as indicated at 29c. Prior to winding the conductor 31 on the armature laminations, end plates 59 of insulator material may be applied on either end of the armature to protect the windings from the sharp edges of the laminations.

Referring still to Figs. 4 through 8, it will be noted that the pole faces of the field magnets 26 and 27 are continuously grooved by the projecting leaves 52 which are of graduated thickness. These continuous grooves are axially spaced and circular in extent so that the projecting leaves 33 of the rotating armature may fit therein. Although various combinations of lamination papers may be used to obtain different patterns at the pole edges and at the pole joining portions, the field laminations in general comprise central tooth laminations 61 having disposed on either side thereof step laminations 62 of greater inside diameter, and disposed on the outsides of the step laminations are root laminations 63 having paper spacers 64 disposed between them. The laminations just mentioned, together with the spacers 64, are assembled upon the dowels 23 and rivets 66 are passed therethrough and headed to secure the laminations in an assembly. These laminations are then put upon a winding machine and the field windings 28 applied thereto. Thereafter spacer members 67 are applied at either end of the magnets, both top and bottom, and an end cap 68 is applied and these additional members are secured to the magnet by rivets 69 that are passed therethrough and then headed. In assembly the laminations 61, 62, 63 and their spacers 64 are compressed until their overall length reaches a prescribed dimension, and the rivet 66 is then applied to maintain this dimension. The armature laminations are similarly compressed to a prescribed dimension and then secured by the sleeves 58. These two dimensions are such that the armature teeth fit within the field recesses accurately and the field teeth fit within the armature recesses accurately so that there is no mechanical touching of the armature parts with the field parts.

Referring particularly to Figs. 4 and 5, it will be noted that a diversity of patterns may be obtained at the end portions of the pole faces of each magnet 26 and 27. I prefer to have my combined motor poles weakest at the section where the two field magnets 26 and 27 join, and accordingly I provide a loose interfitting of the magnets. Thus some of the tooth field laminations 61 may be provided with end teeth 71 that fit in the bottom of the armature recess, while other tooth laminations 61, particularly those of the opposite pole member, may be provided with teeth 72 that project a short distance removed from the armature recess. Thus two tooth laminations 61 on opposing poles which obviously must be aligned with each other may be made to overlap each other with respect to a line drawn from the armature radius. The overlapping of these tooth members may be alternate from one to the next with respect to which magnet component is adjacent to the armature recess. The step members 62 of the field winding may also interleave or overlap each other according to any desired pattern. I prefer, however, that the region of overlap of any of the two poles 26 and 27 be the region of least metal for the common poles formed by the joining of the two magnets so that the magnets will be weakest at these portions in addition to the weakness inherent because of the joining portion being remote from the field windings 28. The overlap of the two field magnets 26 and 27 tends to smooth out the torque of the armature due to the attraction and repulsion between field pole faces and armature leaves, it being apparent as explained with reference to Figs. 1 and 3 that the changeover from attraction to repulsion occurs along a generally vertical line with respect to disclosure of the Figs. 1 through 4.

I prefer to also pattern the edges of motor poles so as to smooth out the torque of the armature coming into successive contact with this strongest portion of the magnetic fields. Accordingly, as shown best in Figs. 4 and 5, I provide some of the tooth laminations 61 with projecting peaks 73, while others are cut off in this general region as at 74. Likewise, the step laminations 62 may be contoured in this region as well as the root laminations 63. The effect of such patterning of the pole edges is to give a graduated attraction force to the armature leaves 33 such as is available with a skewed armature in a conventional electric motor. In this connection it should be noted that there is a fairly substantial gap between armature leaves 33, necessitated to provide ample space for applying the windings 31 to the armature. The combinations inherent in the contouring of three different sizes of laminations are practically limitless, so that any type of magnetic attraction curve may be obtained for the rotating armature leaves 33. I prefer, however, to contour these field laminations so as to obtain a logarithmic curve of attraction; that is, one that starts out rather gently and ends somewhat abruptly, thereby obtaining a maximum efficiency in the smoothing of the torque characteristic of the armature.

Referring to Fig. 8, it will be obvious that I obtain an extremely large area of magnetic air gap, not only by interleaving the armature and the field magnets, but also by stepping the interleaving. The lines of flux may be indicated by continuous lines 76 that cross the air gap. The graduated thickness of the overlap leaves permits a gradual buildup of flux lines in one member without concentrating these lines unduly at any region. In this way I obtain maximum utilization of all metal that is disposed within the field magnet and the armature.

Motors made in accordance with the general disclosures of Figs. 4 through 8 have proved to be very efficient, and in the particular designs tested by me have been characterized by a speed of about 2600 R. P. M. From a motor about three inches in diameter and five inches long I have obtained one-quarter horsepower at 2600 R. P. M. at an efficiency of about 72%. The brushes may have a slight lead to increase the efficiency or characteristics of the motor if desired. Also a mechanism made in accordance with my construction may be used as a generator.

Although my invention has been described with reference to a particular embodiment thereof, it is not limited to this embodiment, nor otherwise, except by the terms of the following claim.

I claim:

An electric motor comprising, an armature adapted to rotate about an axis and having projecting leaves that are formed in axially extending rows on the circumference thereof and that are axially spaced along the armature, and a field winding of two general C-shaped magnets disposed tip-to-tip and having windings about the central part of the C-shapes and having leaves projecting from the pole faces thereof to fit between the projecting leaves of the armature, characterized by the edges of the field leaves adjacent to the windings being differently contoured to provide pole face edges having a pre-selected flux density pattern.

ALEX BERTEA.

REFERENCES CITED

The following references are of record in the file of this patent:

UNITED STATES PATENTS

| Number | Name | Date |
| --- | --- | --- |
| 152,772 | Sims | July 7, 1874 |
| 217,807 | Ludwig | July 22, 1879 |
| 1,353,658 | Kostko | Sept. 21, 1920 |
| 1,538,196 | Livingston | May 19, 1925 |
| 1,721,419 | Staak | July 16, 1929 |
| 2,304,607 | Sleeter | Dec. 8, 1942 |